(No Model.)
E. MOLES.
ROAD CART.
No. 354,728. Patented Dec. 21, 1886.
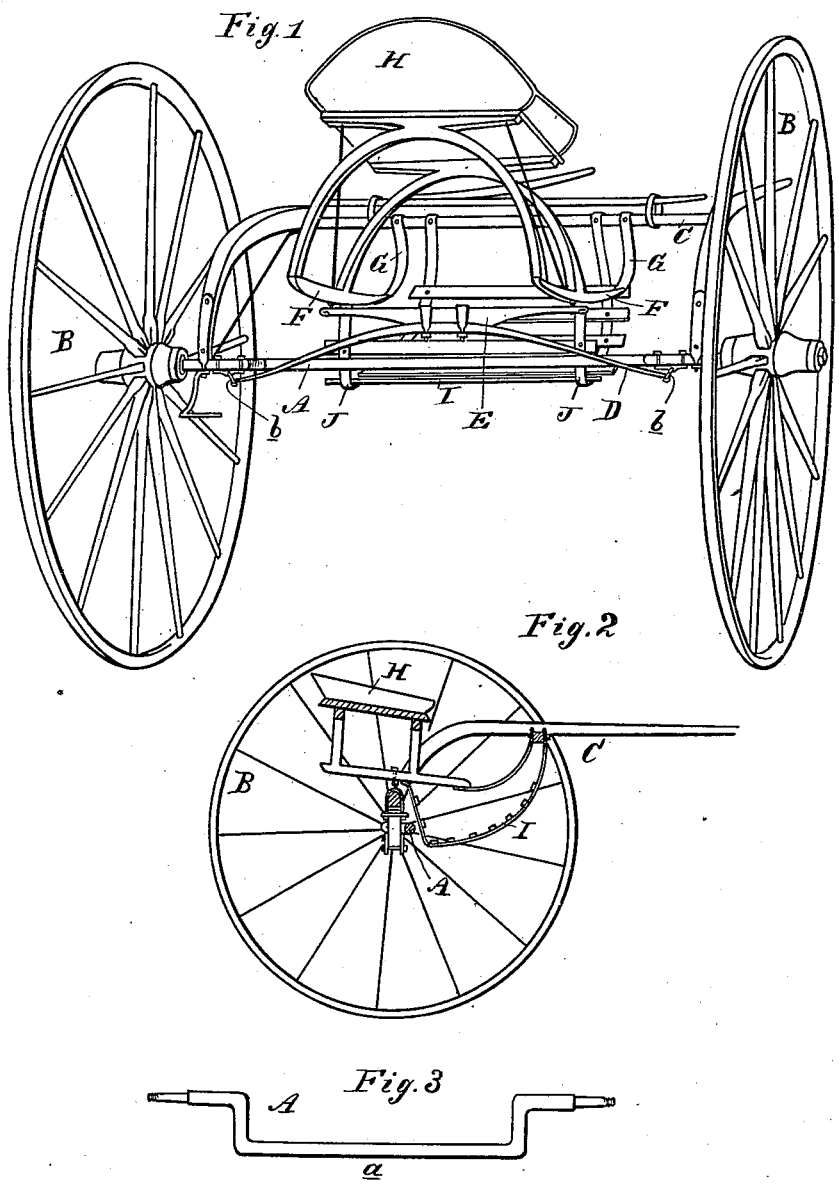
Attest:
John Schuman.
Inventor:
Edward Moles.
by his Att'y

UNITED STATES PATENT OFFICE.

EDWARD MOLES, OF QUINCY, MICHIGAN, ASSIGNOR OF ONE-HALF TO C. V. R. POND, OF SAME PLACE.

ROAD-CART.

SPECIFICATION forming part of Letters Patent No. 354,728, dated December 21, 1886.

Application filed October 14, 1886. Serial No. 216,215. (No model.)

*To all whom it may concern:*

Be it known that I, EDWARD MOLES, of Quincy, in the county of Branch and State of Michigan, have invented new and useful Improvements in Road-Carts; and I do hereby declare that the following is a full, clear, and exact description thereof, reference being had to the accompanying drawings, which form a part of this specification.

This invention relates to certain new and useful improvements in road-carts, by means of which the "horse-motion," as it is termed, is not felt by the rider, and great ease and comfort is obtained.

The invention consists in the peculiar construction of the various parts, and their combinations, as more fully hereinafter described.

Figure 1 is a perspective view of my improved cart from the rear. Fig. 2 is a vertical longitudinal section of the same. Fig. 3 is a plan of the axle.

In the accompanying drawings, which form a part of this specification, A represents an axle, upon which are mounted the wheels B. This axle is formed with an offset, $a$, either to the front or rear, and is so formed for the purpose of bringing the spring in direct line with the axle-arms, as hereinafter described.

C are the shafts, the heels of which are rigidly secured by clips to the axle, as in the usual manner.

D is a spring, the ends of which are hung in loops $b$, which are in turn pivotally clipped to the axle, as shown, thus bringing the spring in direct line with the axle arms. Secured upon this spring is a spring-block, E, to the ends of which the lower seat-bars, F, are secured by a knuckle-joint, as shown, while the front ends of these seat-bars are connected to the whiffletree-bar of the shafts by strap-springs G, and by this means all swaying of the spring is prevented.

H is the seat, which is secured in any convenient manner to the seat-bars F; or any other style of seat or body may be mounted upon the spring-bar without departing from the spirit of my invention.

I is a slatted foot-rest supported by the bars J, the front and rear ends of which are connected to the whiffletree-bar and seat-bars, respectively.

By this construction and manner of supporting the seat, with all of its connections, in rear of the whiffletree-bars, it will readily be observed that none of the so-called "horse-motion" can be imparted to the driver, while at the same time the weight of the driver, in passing over a rise, will have no tendency to "break up" the horse.

What I claim as my invention is—

1. In a two-wheeled vehicle, the combination of a spring suspended from the axle in direct line with the axle-arms, a spring-bar, and seat-bars secured to the spring-bar by knuckle-joints and to the whiffletree-bar by strap-springs, all substantially as described.

2. In a two-wheeled vehicle, the combination of the axle provided with an offset, a spring hung within such offset, a spring-bar, and seat-bars secured to said spring-bar by knuckle-joints and by strap-springs to the whiffletree-bar of the shafts, all combined and arranged substantially in the manner and for the purposes described.

3. In a two-wheeled vehicle, the combination of the axle A, formed with offset $a$, wheels B, shafts C, spring D, hung on loops $b$, pivoted to the axle, spring-bar E, secured to said springs, seat-bars F, secured to said spring-bar by knuckle-joints, and strap-springs G, substantially in the manner and for the purposes set forth.

EDWARD MOLES.

Witnesses:
M. M. BROWN.
C. V. R. POND.